United States Patent
Nomoto

(10) Patent No.: US 11,833,983 B2
(45) Date of Patent: Dec. 5, 2023

(54) PROTECTOR

(71) Applicant: Yazaki Corporation, Tokyo (JP)

(72) Inventor: Takashi Nomoto, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 22 days.

(21) Appl. No.: 17/695,087

(22) Filed: Mar. 15, 2022

(65) Prior Publication Data

US 2022/0306017 A1    Sep. 29, 2022

(30) Foreign Application Priority Data

Mar. 29, 2021   (JP) ................................ 2021-054624

(51) Int. Cl.
  *B60R 16/02*   (2006.01)
  *H02G 3/04*    (2006.01)
  *H01B 7/00*    (2006.01)

(52) U.S. Cl.
  CPC ....... *B60R 16/0215* (2013.01); *H01B 7/0045* (2013.01); *H02G 3/0418* (2013.01)

(58) Field of Classification Search
  CPC ............ B60R 16/0207; B60R 16/0215; H01B 7/0045; H02G 3/0418; H02G 3/0431; H02G 3/0437
  See application file for complete search history.

(56) References Cited

U.S. PATENT DOCUMENTS

| | | | | |
|---|---|---|---|---|
| 5,739,470 A | * | 4/1998 | Takeda | ................. H02G 3/0487 174/101 |
| 11,433,828 B2 | * | 9/2022 | Molyneux | ............... E05D 5/062 |
| 11,581,715 B2 | * | 2/2023 | Nomoto | ............... H02G 3/0456 |
| 2003/0213607 A1 | * | 11/2003 | Katsumata | .............. E05D 5/062 174/68.3 |
| 2005/0217888 A1 | * | 10/2005 | Arai | ..................... H02G 3/0418 174/72 A |
| 2014/0060923 A1 | * | 3/2014 | Takaya | ................ B60R 16/0215 174/72 A |
| 2018/0358766 A1 | * | 12/2018 | Masuki | ............... H01M 50/507 |
| 2021/0016727 A1 | | 1/2021 | Kimura et al. | |
| 2021/0344179 A1 | * | 11/2021 | Mourieras | ................ H02G 1/08 |

FOREIGN PATENT DOCUMENTS

| | | |
|---|---|---|
| JP | 2002-44825 A | 2/2002 |
| JP | 2017-163664 A | 9/2017 |
| JP | 2019-198135 A | 11/2019 |
| JP | 2021-019424 A | 2/2021 |

* cited by examiner

*Primary Examiner* — Paresh Paghadal
(74) *Attorney, Agent, or Firm* — Sughrue Mion, PLLC

(57) ABSTRACT

A protector includes: a first fixing part; a second fixing part; and a protector main body including a housing space that is positioned between the first fixing part and the second fixing part, and houses a first routing member and a second routing member. The housing space is configured with: at least a pair of opposing faces opposing to each other, and a connection face that connects the pair of opposing faces; and includes a first routing member housing space and a second routing member housing space. The second routing member housing space: is configured with at least the pair of opposing faces and the connection face; and houses the second routing member. The first routing member housing space: communicates with the second routing member housing space; is configured with a restriction groove provided in the connection face; and houses the first routing member.

8 Claims, 9 Drawing Sheets

PROTECTOR

CROSS-REFERENCE TO RELATED APPLICATION(S)

The present application claims priority to and incorporates by reference the entire contents of Japanese Patent Application No. 2021-054624 filed in Japan on Mar. 29, 2021.

BACKGROUND OF THE INVENTION

1. Field of the Invention

The present invention relates to a protector.

2. Description of the Related Art

A vehicle such as an automobile includes a wire harness for mutually connecting various kinds of devices in the vehicle. Among such wire harnesses, there is a type that includes a protector for protecting a routing member configuring the wire harness from outside.

The protector has a housing space for housing the routing member, and protects the routing member by housing the routing member inside the housing space. Among such type of protectors, there is a protector that houses a plurality of routing members in the housing space and collectively protects the routing members (for example, see Japanese Patent Application Laid-open No. 2021-19424).

However, there is a following problem with the above-described protector when a desired routing member among the routing members housed in the housing space is moved to be electrically connected to another device or the like. That is, with the protector, the routing members are randomly disposed in the housing space. Therefore, with the protector, when a desired routing member among the routing members housed in the housing space is moved to be electrically connected to another device or the like, for example, the desired routing member may contact with the other routing members so that the other routing members may be moved together with the desired routing member since the move of each of the routing member is allowed.

SUMMARY OF THE INVENTION

The present invention is made in view of such a situation, and provides a protector capable of suppressing another routing member from being moved together with the desired routing member.

In order to achieve the above mentioned object, a protector according to one aspect of the present invention includes a first fixing part that fixes a first routing member; a second fixing part that fixes the first routing member and a second routing member, the second fixing part being away from the first fixing part; and a protector main body positioned between the first fixing part and the second fixing part, the protector main body including a housing space for housing the first routing member and the second routing member, wherein the housing space is configured with at least a pair of opposing faces opposing to each other and a connection face connecting the pair of opposing faces, and includes a first routing member housing space and a second routing member housing space, the second routing member housing space is configured with at least the pair of opposing faces and the connection face, and houses the second routing member, and the first routing member housing space communicates with the second routing member housing space, is configured with a restriction groove provided in the connection face, and houses the first routing member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Hereinafter, an embodiment of a protector according to the present invention will be described with reference to the accompanying drawings. Note that the present invention is not limited by the embodiment. Furthermore, the structural elements of the embodiment described hereinafter include elements easily occurred to those skilled in the art or substantially the same elements.

Figure 1:
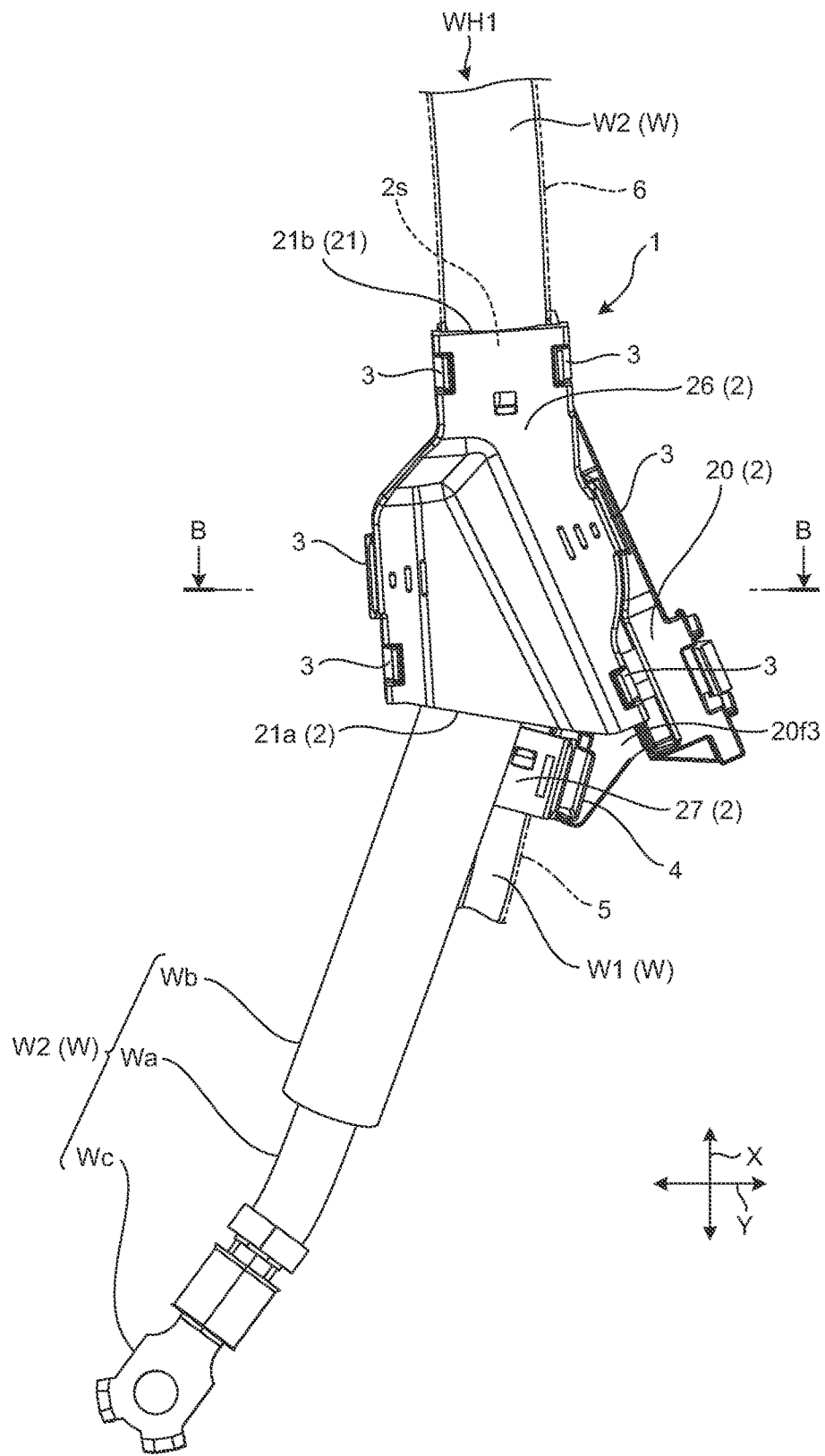
FIG. 1 is a plan view of a protector according to an embodiment.
Figure 2:
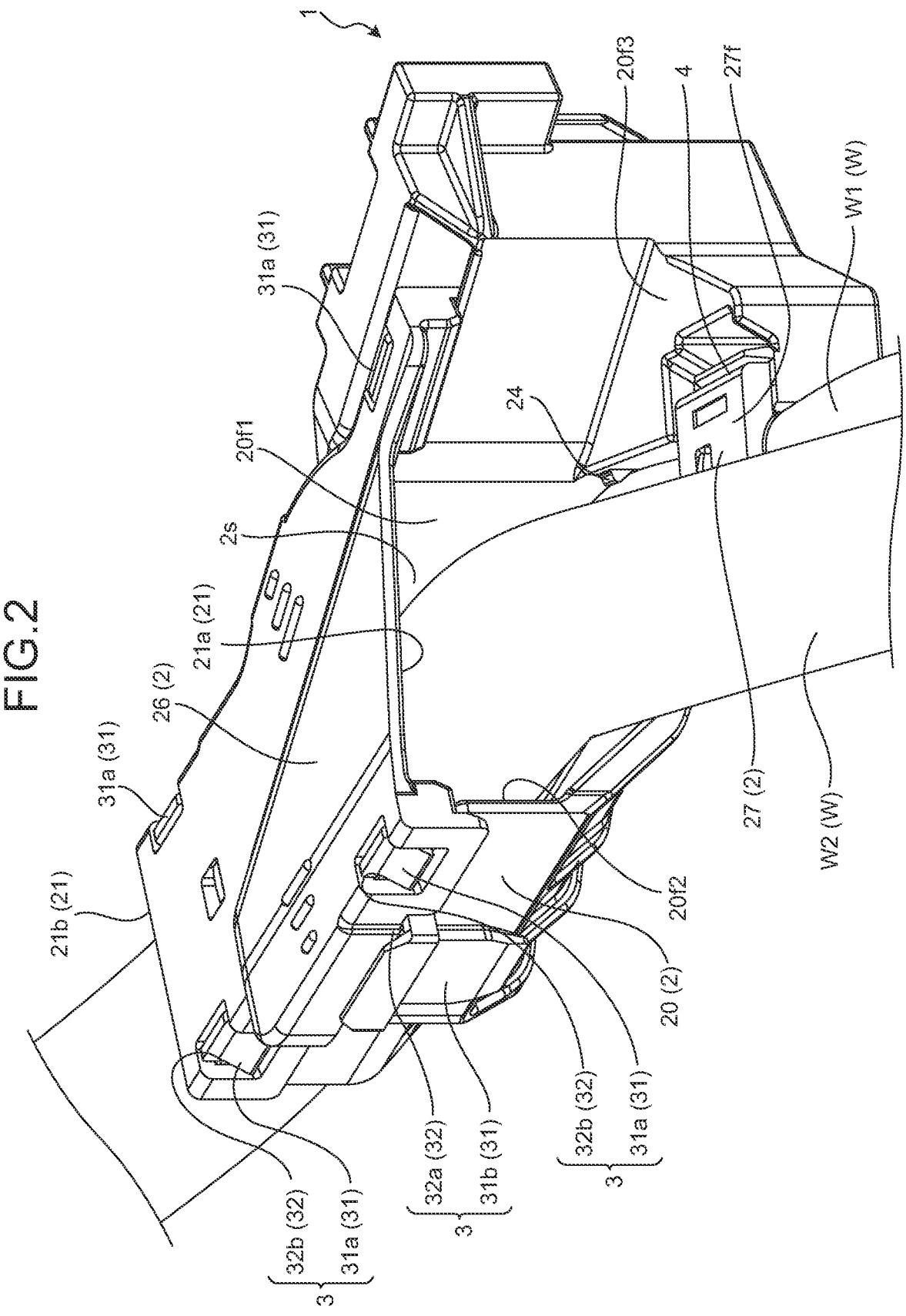
FIG. 2 is a perspective view of the protector according to the embodiment.
Figure 3:
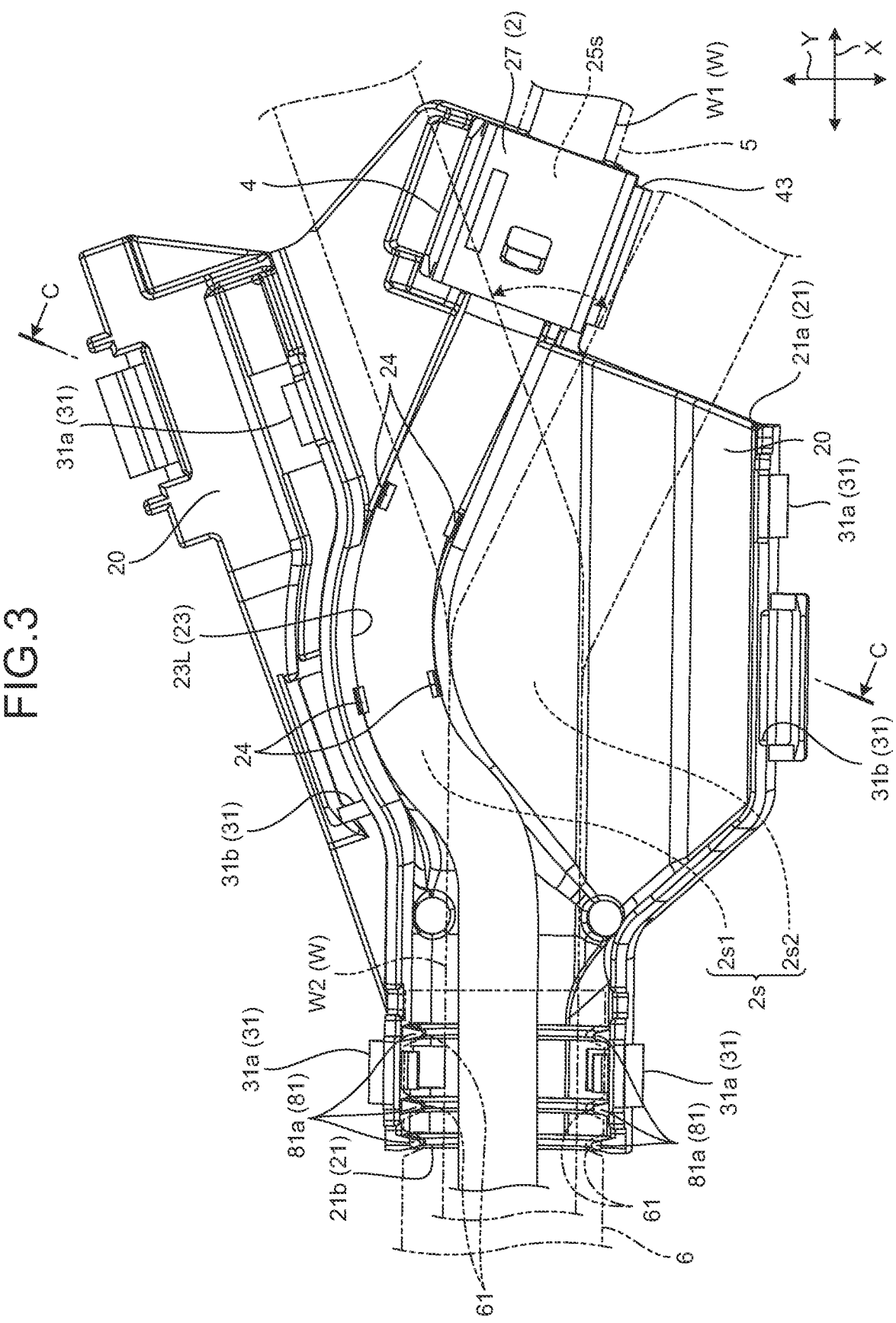
FIG. 3 is a plan view of the protector in a state where a lid member is removed and before a second routing member is routed.
Figure 4:
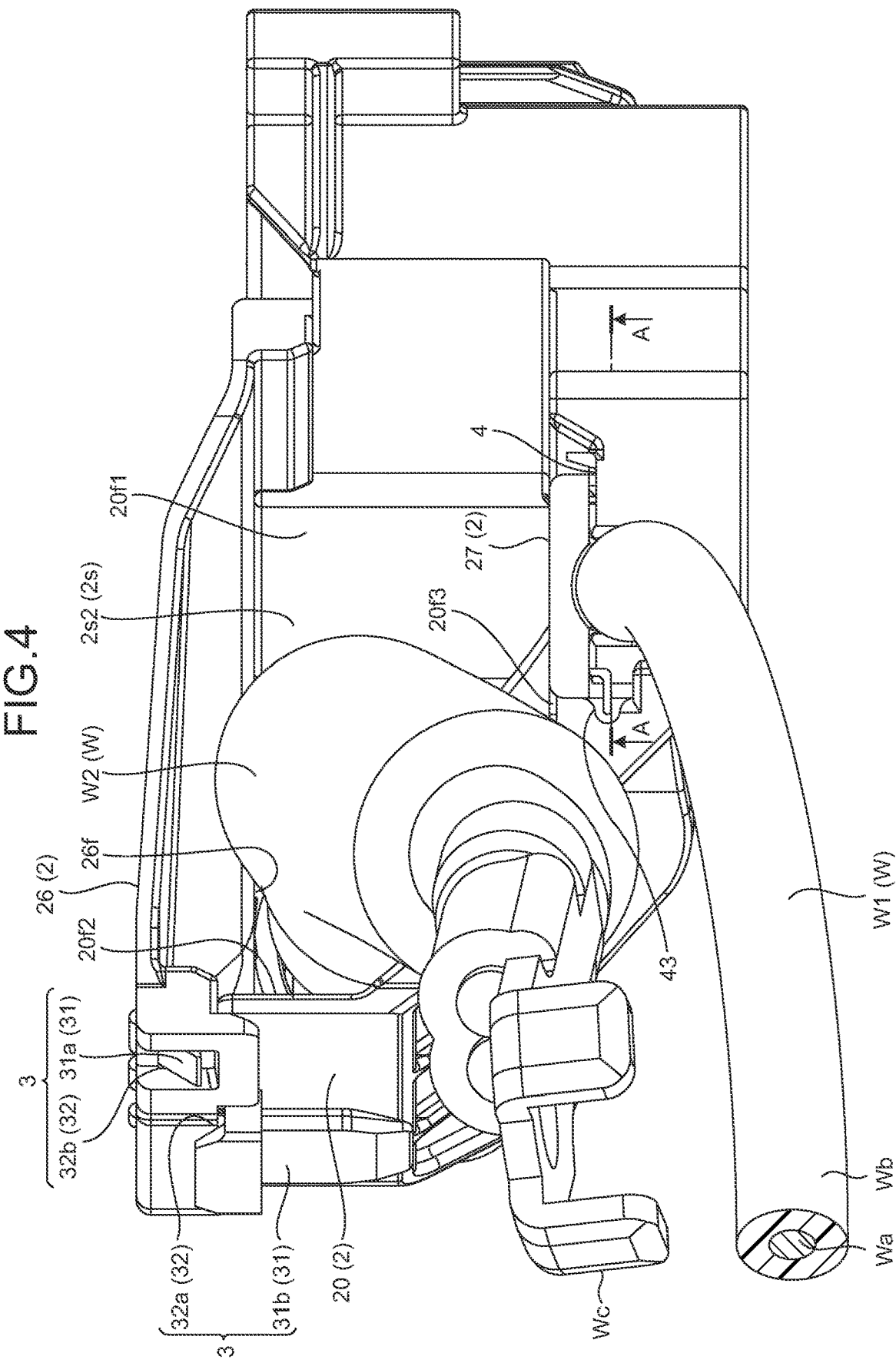
FIG. 4 is a side view of the protector according to the embodiment when viewed from one side along a length direction.
Figure 5:
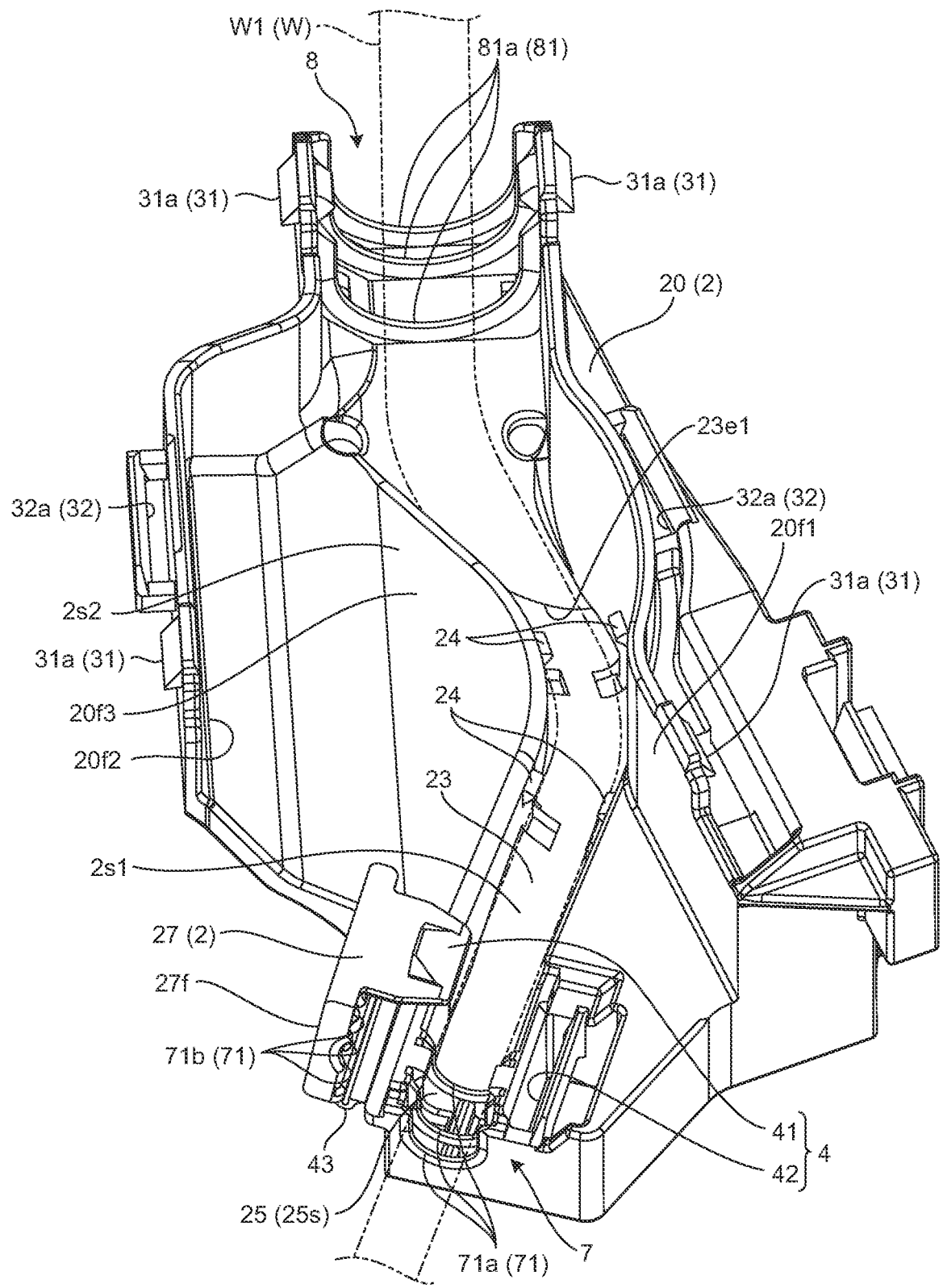
FIG. 5 is a perspective view illustrating a housing space of the protector according to the embodiment.
Figure 6:
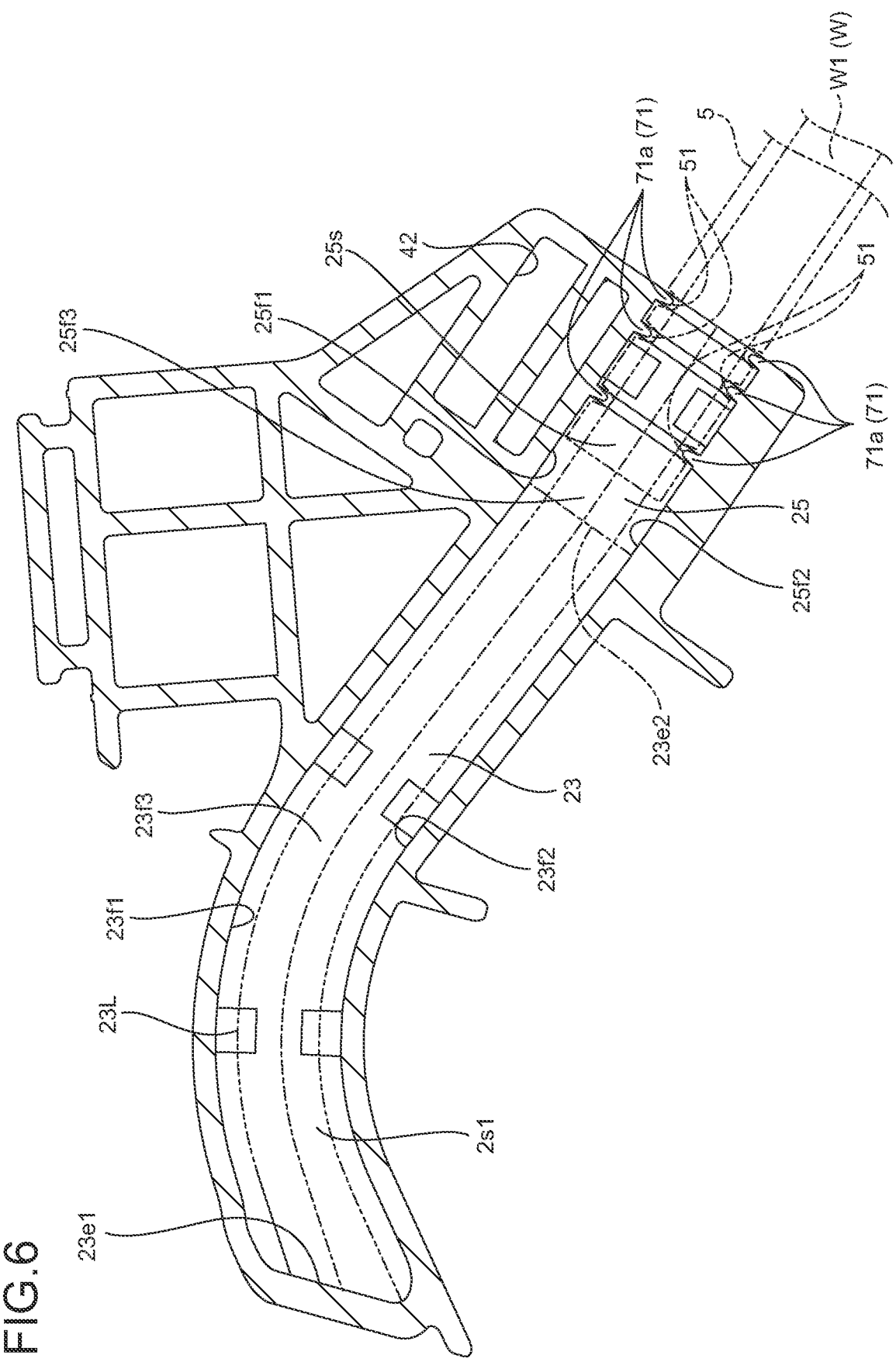
FIG. 6 is a sectional view taken along the line A-A of FIG. 4.
Figure 7:
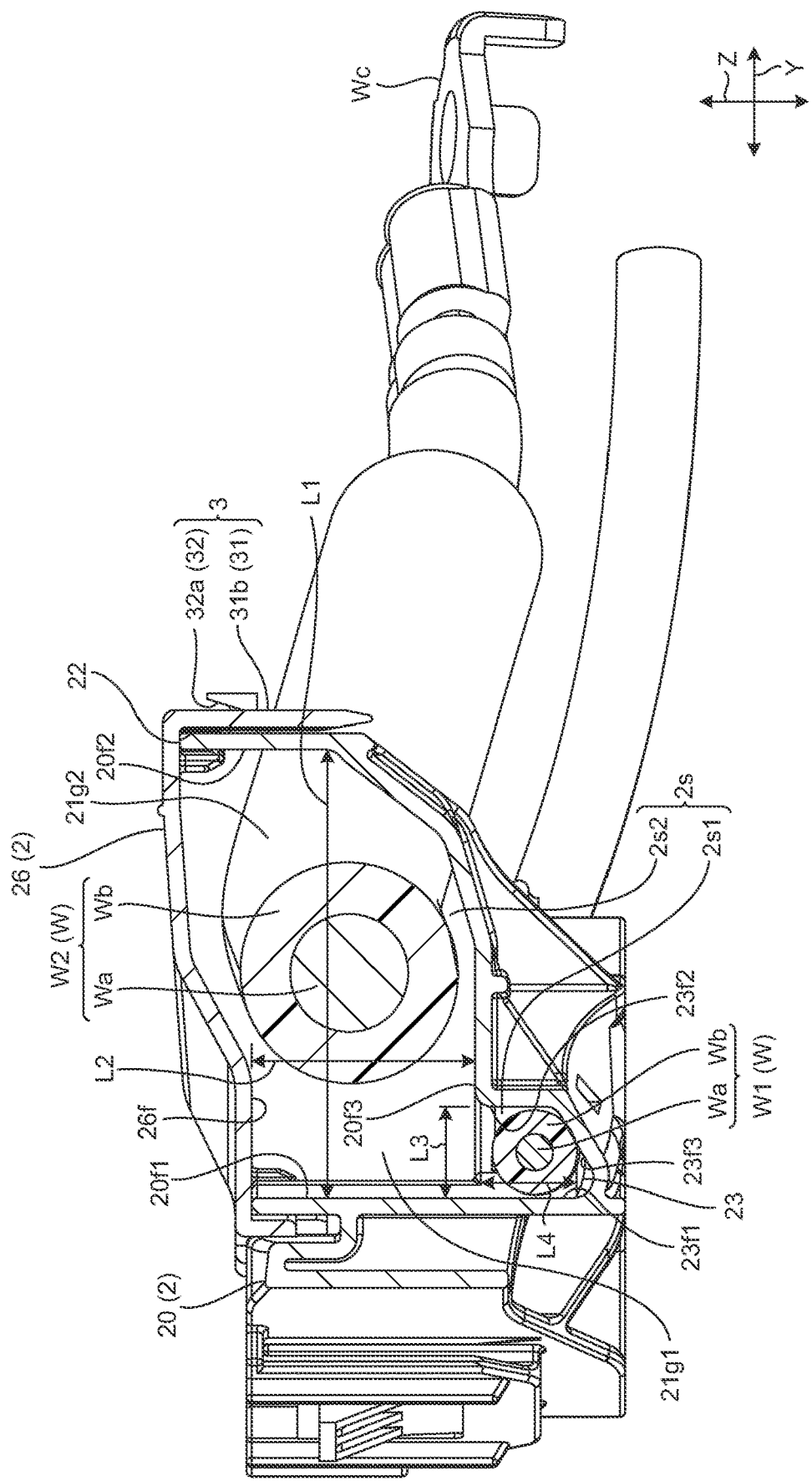
FIG. 7 is a sectional view taken along the line B-B of FIG. 1.
Figure 8:
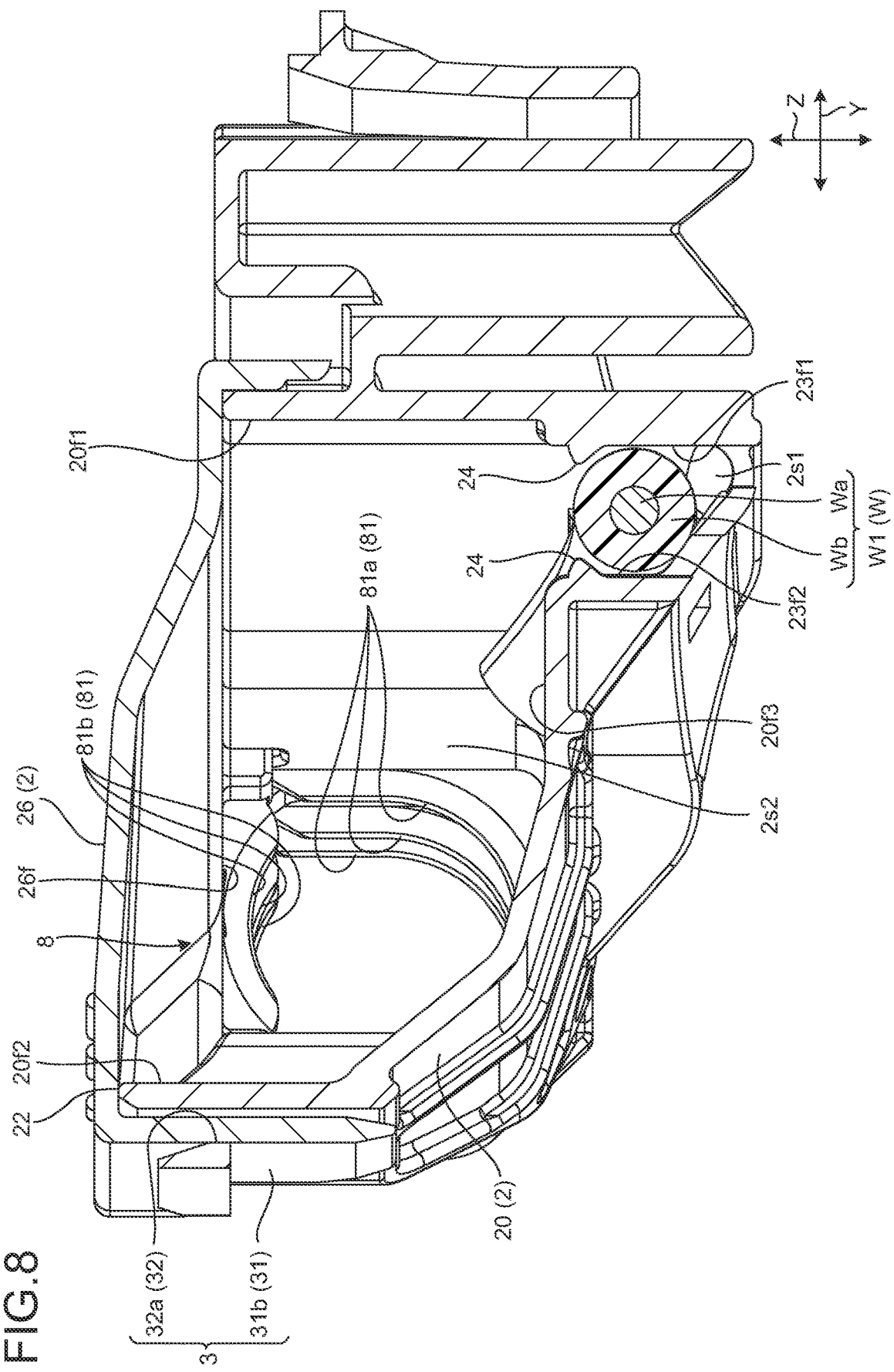
FIG. 8 is a sectional view taken along the line C-C of FIG. 3.
Figure 9:
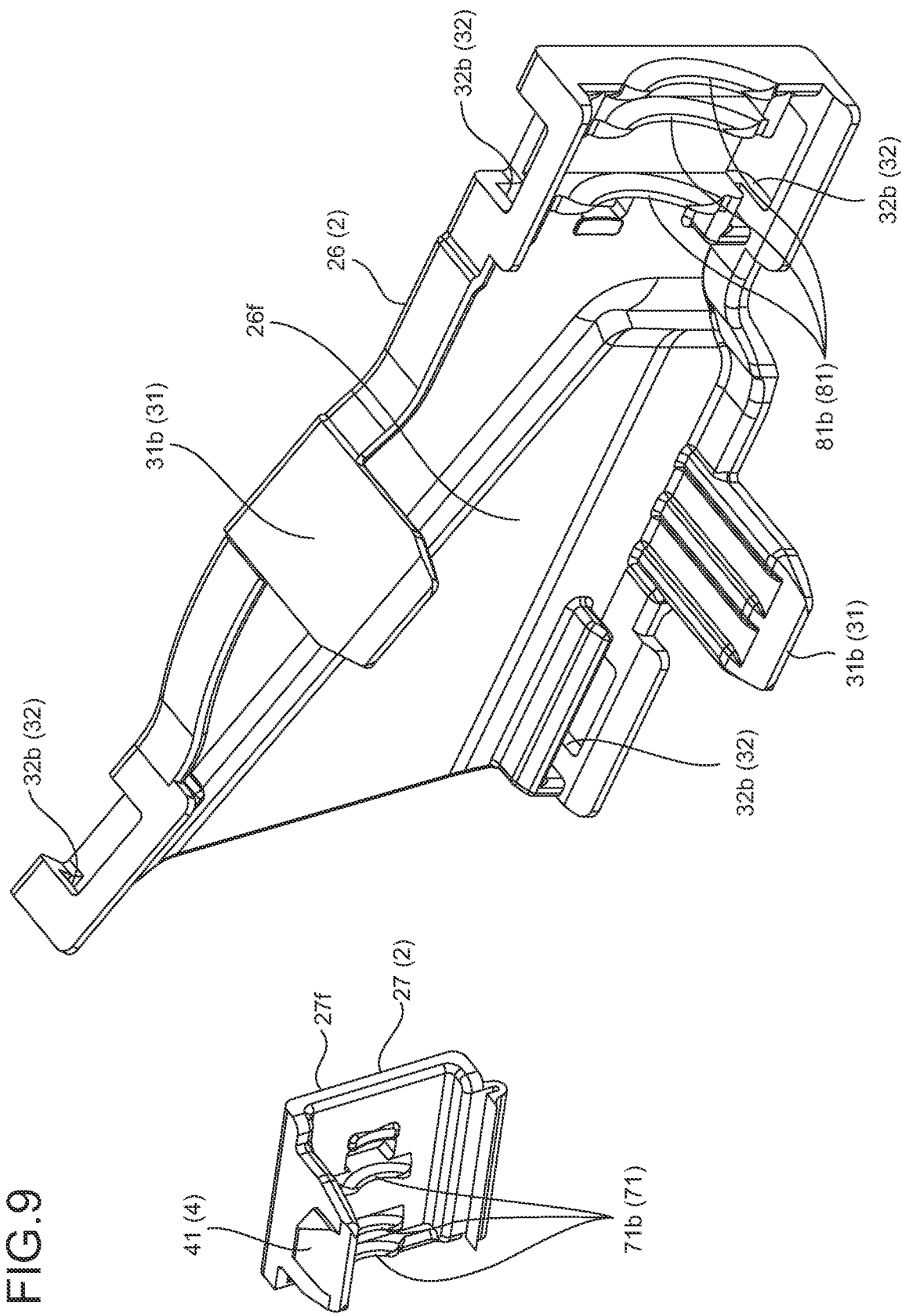
FIG. 9 is a perspective view illustrating the lid member and a cover member.

FIG. 1 is a plan view of a protector 1 according to the embodiment. FIG. 2 is a perspective view of the protector 1 according to the embodiment. FIG. 3 is a plan view of the protector 1 in a state where a lid member 26 is removed and before a second routing member W2 is routed. FIG. 4 is a side view of the protector 1 according to the embodiment when viewed from one side along a length direction X. FIG. 5 is a perspective view illustrating a housing space 2s of the protector 1 according to the embodiment. FIG. 6 is a sectional view taken along the line A-A of FIG. 4. FIG. 7 is a sectional view taken along the line B-B of FIG. 1. FIG. 8 is a sectional view taken along the line C-C of FIG. 3. FIG. 9 is a perspective view illustrating the lid member 26 and a cover member 27.

In the explanations hereinafter, "X" is the length direction of a protector main body 2 according to the embodiment. Furthermore, "Y" is a first orthogonal direction that is orthogonal to the length direction X in the protector 1 according to the embodiment. Furthermore, "Z" is a second orthogonal direction that is orthogonal to the length direction X and the first orthogonal direction Y in the protector 1 according to the embodiment. In the protector 1 according to the embodiment, the length direction X, the first orthogonal direction Y, and the second orthogonal direction Z are orthogonal to each other.

The protector 1 according to the embodiment illustrated in FIG. 1 and FIG. 2 is assembled to a wire harness WH1 that is loaded on a vehicle such as an automobile, and attached to a routing member W exhibiting conductivity so as to protect the routing member W. The wire harness WH1 bundles a plurality of routing members W used for power supply and signal communication to be in an assembly for connecting each of devices loaded on a vehicle, for example, and connects the routing members W to each of the devices via a connector and the like. The wire harness WH1 includes the routing members W exhibiting conductivity and the protector 1 that is assembled to the routing member W to protect the routing members W. The routing member W is formed with an electric wire, for example. The electric wire is configured by covering, with an insulating coating part Wb, outside of a core wire Wa as a conductor part formed with a plurality of conductive metal wires (see FIG. 7). In addition, the wire harness WH1 may further include a connector, an electrical junction box, a grommet, a fixture, and the like. Hereinafter, the configuration of the protector 1 will be described in detail by referring to each of the drawings.

The protector 1 is formed with an insulating synthetic resin material. The protector 1 of the embodiment includes a first routing member W1 and a second routing member W2 as the routing members W to be protected. As illustrated in FIG. 7, the diameter of the second routing member W2 is larger than the diameter of the first routing member W1. Furthermore, a terminal Wc is provided at one end of the second routing member W2. The terminal Wc electrically connects the routing member W provided to another electric device and the second routing member W2.

The protector 1 includes the protector main body 2 having the housing space 2s, a first fixing part 7, and a second fixing part 8. The protector main body 2 is configured with a base member 20, the lid member 26, the cover member 27, first lock mechanisms 3 for locking the lid member 26 to the base member 20, and a second lock mechanism 4 for locking the cover member 27 to the base member 20. As for the protector 1 of the embodiment, the base member 20, the lid member 26, and the cover member 27 are formed as separate bodies. The lid member 26 is assembled to the base member 20 by the first lock mechanisms 3, and the cover member 27 is assembled to the base member 20 by the second lock mechanism 4.

The protector main body 2 is formed in a gutter shape with both ends in the length direction X and one end in the second orthogonal direction Z (the upper end of the top-and-bottom direction) being opened. As for the protector main body 2, the first routing member W1 is housed by being curved with respect to the length direction X inside the protector main body 2, for example, and the first routing member W1 is inserted along the length direction X.

As illustrated in FIG. 7, the base member 20 includes a pair of opposing faces 20f1 and 20f2 opposing to each other in the first orthogonal direction Y, and a connection face 20f3 that connects the pair of opposing faces 20f1 and 20f2.

As illustrated in FIG. 1, the connection face 20f3 is formed extending to the outer side of the housing space 2s through a first insertion opening part 21a.

As illustrated in FIG. 7 and FIG. 8, the lid member 26 includes the connection face 20f3 and a lid face 26f opposing thereto in the second orthogonal direction Z in a state where the lid member 26 is closed against the base member 20. Furthermore, the housing space 2s is configured with the pair of opposing faces 20f1, 20f2 opposing in the first orthogonal direction Y, the connection face 20f3 that connects the pair of opposing faces 20f1, 20f2, and the lid face 26f that is formed in the lid member 26 and opposes to the connection face 20f3. That is, the housing space 2s according to the embodiment is configured with at least the pair of opposing faces 20f1 and 20f2 opposing to each other, and the connection face 20f3 that connects the pair of opposing faces 20f1 and 20f2. Furthermore, the base member 20 has an insertion opening part 21 at both ends in the length direction X (see FIG. 1) and includes an open/close opening part 22 on one side of the second orthogonal direction Z (see FIG. 7, FIG. 8).

The insertion opening part 21 is an opening part for inserting the first routing member W1 and the second routing member W2 into the housing space 2s. The insertion opening part 21 includes a first insertion opening part 21a and a second insertion opening part 21b formed at both ends of the base member 20 in the length direction X. The first insertion opening part 21a is opened along the first orthogonal direction Y and the second orthogonal direction Z. The second insertion opening part 21b is along the first orthogonal direction Y in an inclined form and opened along the second orthogonal direction Z.

The open/close opening part 22 is an opening part for opening the housing space 2s toward the outer side, and it is an opening part closed by the lid member 26. The open/close opening part 22 is opened when inserting the first routing member W1 and the second routing member W2 into the housing space 2s, for example, and closed by the lid member 26 after the routing members W are inserted into the housing space 2s. The open/close opening part 22 is positioned at one end of the base member 20 in the second orthogonal direction Z (upper end in the top-and-bottom direction), and formed on the opposite side from where the connection face 20f3 is formed in the second orthogonal direction Z.

Furthermore, the housing space 2s includes: a second routing member housing space 2s2 configured with the pair of opposing faces 20f1, 20f2, the connection face 20f3, and the lid face 26f; and a first routing member housing space 2s1 that communicates with the second routing member housing space 2s2 and is formed with a restriction groove 23 provided in the connection face 20f3. That is, the housing space 2s according to the embodiment includes: the second routing member housing space 2s2 configured with at least the pair of opposing faces 20f1, 20f2 and the connection face 20f3; and the first routing member housing space 2s1 that communicates with the second routing member housing space 2s2 and is formed with the restriction groove 23 provided in the connection face 20f3.

As for the second routing member housing space 2s2, a length L1 in the first orthogonal direction Y illustrated in FIG. 7 is larger than the diameter of the second routing member W2 and a length L2 in the second orthogonal direction Z is larger than the diameter of the second routing member W2 in the sectional view orthogonal to the length direction X. Therefore, the second routing member housing space 2s2 is capable of housing the second routing member W2. Furthermore, the second routing member housing space 2s2 is extended linearly with respect to the length direction X.

Moreover, as illustrated in FIG. 7, the second routing member housing space 2s2 in a state where the second routing member W2 is being housed therein, a first gap 21g1 exists between the peripheral face of the second routing member W2 and the one opposing face 20f2, and a second gap 21g2 exists between the peripheral face of the second routing member W2 and the other opposing face 20f1. This allows the second routing member W2 to move in the second orthogonal direction Z in the second routing member housing space 2s2.

As for the restriction groove 23 forming the first routing member housing space 2s1, a length L3 in the first orthogonal direction Y illustrated in FIG. 7 is slightly larger than the diameter of the first routing member W1 and a depth L4 in the second orthogonal direction Z is slightly larger than the diameter of the first routing member W1 in the sectional view orthogonal to the length direction X. Therefore, the first routing member housing space 2s1 is capable of housing the first routing member W1.

As illustrated in FIG. 6, the restriction groove 23 starts from the middle (one end part 23e1) of the housing space 2s and ends at the other end (other end part 23e2) of the housing space 2s in the length direction X. That is, the restriction groove 23 has the one end part 23e1 and the other end part 23e2 positioned inside the housing space 2s. Furthermore, the first routing member W1 is laid over the connection face 20f3 at the one end part 23e1 of the restriction groove 23, and the side laid over on the connection face 20f3 is housed in the second routing member housing space 2s2. Furthermore, the restriction groove 23 includes a curved part 23L formed curving with respect to the length direction X. That is, the restriction groove 23 provided in the connection face 20f3 of the protector 1 according to the embodiment includes the curved part 23L formed curving. The restriction groove 23 discussed in this example is curved with respect to the first orthogonal direction Y that is a direction different from the routing direction of the first routing member W1.

As illustrated in FIG. 6, FIG. 7, and FIG. 8, the restriction groove 23 is configured with a pair of restriction groove opposing faces 23f1 and 23f2 opposing to each other, and a restriction groove connection face 23f3 that connects the pair of restriction groove opposing faces 23f1 and 23f2. That is, the restriction groove 23 includes the pair of restriction groove opposing faces 23f1 and 23f2 opposing to each other.

The base member 20 includes a stopper rib 24 that is protruded from at least one of the restriction groove opposing faces 23f1 and 23f2 out of the pair of restriction groove opposing faces 23f1 and 23f2 toward the first routing member housing space 2s1. That is, the protector main body 2 according to the embodiment includes the stopper rib 24 that is protruded from at least one of the restriction groove opposing faces 23f1 and 23f2 out of the pair of restriction groove opposing faces 23f1 and 23f2 toward the first routing member housing space 2s1.

The stopper rib 24 is disposed on the connection face 20f3 side of the restriction groove opposing faces 23f1 and 23f2. The stopper ribs 24 according to the embodiment are provided to each of the restriction groove opposing faces 23f1 and 23f2 as respective pairs, and the stopper ribs 24 as the pair oppose to each other. Furthermore, the space between the tips of the pair of the stopper ribs 24 is smaller than the diameter of the first routing member W1. Therefore, even when a force is applied to the first routing member W1 housed in the first routing member housing space 2s1, it is possible to restrict the move thereof from the first routing member housing space 2s1 to the second routing member housing space 2s2.

The stopper ribs 24 are integrally formed with the base member 20. Therefore, it is possible to reduce the number of components compared to a case where the members for restricting the move of the first routing member W1 are provided separately.

Furthermore, as illustrated in FIG. 6, the base member 20 according to the embodiment includes an auxiliary restriction groove 25 adjacent to the restriction groove 23. The auxiliary restriction groove 25 includes an auxiliary housing space 25s capable of housing the first routing member W1. Furthermore, the auxiliary restriction groove 25 is positioned outside the housing space 2s. The auxiliary restriction groove 25 is configured with a pair of auxiliary restriction groove opposing faces 25f1 and 25f2 opposing to each other, and an auxiliary restriction groove connection face 25f3 that connects the pair of auxiliary restriction groove opposing faces 25f1 and 25f2.

The lid member 26 is mounted to the base member 20 and covers (closes) the open/close opening part 22 formed in the base member 20 for forming the housing space 2s. Furthermore, the lid member 26 is positioned at one end of the base member 20 in the second orthogonal direction Z (upper end in the top-and-bottom direction). The lid member 26 is formed in a rectangular plate shape corresponding to the shape of the protector main body 2. The lid member 26 of the embodiments is formed in a width slightly wider than the width of the open/close opening part 22 in the first orthogonal direction Y, and extended in the length direction X.

As illustrated in FIG. 2, FIG. 3, and FIG. 9, each of the first lock mechanisms 3 is configured with: a first engagement claw 31 provided to one of the base member 20 and the lid member 26; and a first engagement hole part 32 provided to the other one of the base member 20 and the lid member 26, which can be engaged/disengaged with/from the first engagement claw 31. The first engagement claw 31 according to the embodiment includes a first base engagement claw 31a provided to the base member 20, and a first lid engagement claw 31b provided to the lid member 26. The first engagement hole part 32 according to the embodiment includes a first base engagement hole part 32a provided to the base member 20, and a first lid engagement hole part 32b provided to the lid member 26.

The base member 20 according to the embodiment includes: on an outer peripheral face on one side of the first orthogonal direction Y, two first base engagement claws 31a and a single first base engagement hole part 32a; and on the outer peripheral face on the other side of the first orthogonal direction Y, two first base engagement claws 31a and a single first base engagement hole part 32a. Furthermore, the single first base engagement hole part 32a is disposed between the two first base engagement claws 31a along the length direction X.

The lid member 26 according to the embodiment includes: on an outer peripheral face on one side of the first orthogonal direction Y, two first lid engagement hole parts 32b and a single first lid engagement claw 31b; and on the outer peripheral face on the other side of the first orthogonal direction Y, two first lid engagement hole parts 32b and a single first lid engagement claw 31b. Furthermore, the single first lid engagement claw 31b is disposed between the two first lid engagement hole parts 32b along the length direction X.

As illustrated in FIG. 5, the cover member 27 is assembled to the base member 20. The cover member 27 is for forming the auxiliary housing space 25s by covering (closing) the auxiliary restriction groove 25 formed in the base member 20. The cover member 27 is formed in a rectangular plate shape. The cover member 27 is formed in a width slightly wider than the width of the auxiliary restriction groove 25 of the embodiment.

As illustrated in FIG. 2, as for the cover member 27 while being closed against the base member 20, a top face 27f of the cover member 27 forms a same plane with the connection face 20f3. Then, a mount face for placing the second routing member W2 is formed with the top face 27f and the connection face 20f3.

As illustrated in FIG. 5, the second lock mechanism 4 is configured with: a second engagement claw 41 provided to one of the base member 20 and the cover member 27; and a second engagement hole part 42 provided to the other one of the base member 20 and the cover member 27, which can be engaged/disengaged with/from the second engagement claw 41. The second engagement claw 41 of the second lock mechanism 4 according to the embodiment is provided to the cover member 27. The second engagement hole part 42 of the second lock mechanism 4 according to the embodiment is provided to the base member 20.

A hinge 43 is provided between the cover member 27 and the base member 20. The hinge 43 connects the cover member 27 to the protector main body 2 in a rotatable manner. Furthermore, the hinge 43 and the second lock mechanism 4 are provided by opposing to the base member 20 with the auxiliary restriction groove 25 interposed therebetween.

As illustrated in FIG. 1, a first sheath member 5 is provided to the outer peripheral face of the first routing member W1 positioned on one side of the length direction X of the housing space 2s. The first sheath member 5 is the so-called corrugated tube, and it is formed in a cylindrical shape (tubular shape) exhibiting flexibility by an insulating synthetic resin material, for example.

More specifically, the first sheath member 5 is provided to the outer peripheral face of the first routing member W1 positioned between the protector 1 and another protector 1, and it is formed in a cylindrical shape covering the first routing member W1. As illustrated in FIG. 6, the first sheath member 5 includes a plurality of first sheath member recessed parts 51 along the circumferential direction. The first sheath member 5 is formed in a bellows-like form with the first sheath member recessed parts 51 being arranged with a space provided therebetween along the length direction X, and the first routing member W1 is inserted to the inside thereof. The inner diameter of such a first sheath member 5 is set by corresponding to the outer diameter of the first routing member W1.

As illustrated in FIG. 3, a second sheath member 6 is provided to the outer peripheral face of the first routing member W1 and the second routing member W2 positioned on one side of the length direction X of the housing space 2s. The second sheath member 6 is the so-called corrugated tube, and it is formed in a cylindrical shape (tubular shape) exhibiting flexibility by an insulating synthetic resin material.

More specifically, the second sheath member 6 is provided to the outer peripheral face of the first routing member W1 and the second routing member W2 positioned between the protector 1 and still another protector 1, and it is formed in a cylindrical shape covering the first routing member W1 and the second routing member W2. The second sheath member 6 includes a plurality of second sheath member recessed parts 61 along the circumferential direction. The second sheath member 6 is formed in a bellows-like form with the second sheath member recessed parts 61 being arranged with a space provided therebetween along the length direction X, and the first routing member W1 and the second routing member W2 are inserted to the inside thereof. The inner diameter of such a second sheath member 6 is set by corresponding to the sum of the outer diameter of the first routing member W1 and the outer diameter of the second routing member W2. That is, the first routing member W1 and the second routing member W2 are collectively inserted to the inside of the second sheath member 6.

The first fixing part 7 and the second fixing part 8 are provided at both ends of the protector main body 2 in the length direction X of the housing space 2s. The first fixing part 7 fixes the first routing member W1 to the protector main body 2, and it is disposed at one end of the protector main body 2 in the length direction X of the housing space 2s. The first fixing part 7 is configured with: the first sheath member recessed parts 51 recessed from the outer peripheral face of the first sheath member 5; and first protruded parts 71 fitted to the first sheath member recessed parts 51. Furthermore, the first fixing part 7 restricts the move of the first routing member W1 with respect to the protector 1 when the first protruded parts 71 are fitted to the first sheath member recessed parts 51. The first fixing part 7 according to the embodiment is positioned on the outer side of the housing space 2s and disposed adjacent to one end of the housing space 2s.

As illustrated in FIG. 5, each of the first protruded parts 71 is configured with: a restriction groove first protruded part 71a formed on the auxiliary restriction groove 25; and a cover member first protruded part 71b formed on the cover member 27.

The second fixing part 8 fixes the first routing member W1 and the second routing member W2 to the protector main body 2, and it is disposed at the other end of the protector main body 2 in the length direction X of the housing space 2s. The second fixing part 8 is disposed away from the first fixing part 7 in the length direction X. The second fixing part 8 is configured with: the second sheath member recessed parts 61 recessed from the outer peripheral face of the second sheath member 6; and second protruded parts 81 fitted to the second sheath member recessed parts 61. Furthermore, the second fixing part 8 restricts the move of the first routing member W1 and the second routing member W2 with respect to the protector 1 when the second protruded parts 81 are fitted to the second sheath member recessed parts 61. The second fixing part 8 according to the embodiment is disposed at the other end of the length direction X on the inner side of the housing space 2s.

As illustrated in FIG. 8, the second protruded part 81 is configured with: a base member second protruded part 81a formed on the base member 20; and a lid member second protruded part 81b formed on the lid member 26 (see FIG. 9).

Next, the protector 1 according to the embodiment will be described by referring to a case where the first routing member W1 and the second routing member W2 are housed in the housing space 2s, and the other end of the second routing member W2 is connected to another device.

An operator first opens the lid member 26 and the cover member 27 from the base member 20. Then, the operator inserts the first routing member W1 to which the first sheath member 5 is provided into the housing space 2s from the open/close opening part 22, and inserts the first routing member W1 into the restriction groove 23 and the auxiliary restriction groove 25 thereafter. At this time, the operator fits the restriction groove first protruded parts 71a to the first sheath member recessed parts 51. Then, the operator closes the cover member 27 and locks the second lock mechanism 4, and fits the cover member first protruded parts 71b to the first sheath member recessed parts 51 to fix the first routing member W1 to the protector main body 2 by the first fixing part 7.

Then, the operator inserts the second routing member W2 into the housing space 2s from the open/close opening part 22, and the second sheath member 6 is provided to the first routing member W1 and the second routing member W2 thereafter. Then, the operator fits the base member second protruded parts 81a to the second sheath member recessed parts 61. Thereafter, the operator closes the lid member 26 and locks the first lock mechanism 3, and fits the lid member second protruded parts 81b to the second sheath member recessed parts 61 to fix the first routing member W1 and the second routing member W2 to the protector main body 2 by the second fixing part 8.

In this state, the second routing member W2 is allowed to move in the housing space 2s since one side thereof in the housing space 2s is fixed by the second fixing part 8 but the other side thereof in the housing space 2s is not fixed. Therefore, when the terminal We positioned at the other end of the second routing member W2 is connected to a terminal of the routing member that is electrically connected to another device, the end on the one side of the second routing member W2 to which the terminal We is provided is allowed to move in the first orthogonal direction Y as illustrated in FIG. 3.

The protector 1 according to the embodiment has the following configuration. The protector 1 according to the embodiment includes: the first fixing part 7 that fixes the first routing member W1; and the second fixing part 8 that fixes the first routing member W1 and the second routing member W2, and is provided away from the first fixing part 7. The housing space 2s is configured with at least the pair of opposing faces 20f1 and 20f2 opposing to each other, and the connection face 20f3 that connects the pair of opposing faces 20f1 and 20f2. The housing space 2s includes the first routing member housing space 2s1 and the second routing member housing space 2s2. The second routing member housing space 2s2 is configured with at least the pair of opposing faces 20f1, 20f2 and the connection face 20f3, and houses the second routing member W2. The first routing member housing space 2s1 communicates with the second routing member housing space 2s2. The first routing member housing space 2s1 is configured with the restriction groove 23 provided in the connection face 20f3, and houses the first routing member W1. With the protector 1 according to the embodiment, the second routing member W2 is allowed to move in the housing space 2s since one side thereof in the housing space 2s is fixed by the second fixing part 8 but the other side thereof in the housing space 2s is not fixed. Moreover, with the protector 1, it is possible to fix the first routing member W1 by the first fixing part 7 and the second fixing part 8, to further house the first routing member W1 in the first routing member housing space 2s1 configured with the restriction groove 23 provided in the connection face 20f3 of the housing space 2s, and to restrict the move of the first routing member W1. As a result, since the protector 1 according to the embodiment is capable of restricting the move of the first routing member W1, it is possible to suppress the first routing member W1 from being moved together with the second routing member W2.

The protector 1 according to the embodiment has the following configuration. The diameter of the second routing member W2 is larger than the diameter of the first routing member W1. Assuming a case of the protector 1 in which the routing member W of a large diameter and the routing member W of a small diameter are mixed in the housing space 2s, the routing member W of the small diameter tends to be moved together with the routing member W of large diameter when the routing member W of large diameter is moved. Meanwhile, with the protector 1 according to the embodiment, the routing member W of the small diameter that tends to be moved together with the move of the routing member W of large diameter is taken as the first routing member W1. As a result, the protector 1 according to the embodiment can securely suppress the first routing member W1 from being moved together with the second routing member W2.

The protector 1 according to the embodiment has the following configuration. The restriction groove 23 includes the pair of restriction groove opposing faces 23f1 and 23f2 opposing to each other. The protector main body 2 includes the stopper rib 24 protruded from at least one of the restriction groove opposing faces 23f1 and 23f2 out of the pair of restriction groove opposing faces 23f1 and 23f2 toward the first routing member housing space 2s1, and the stopper rib 24 is disposed on the connection face 20f3 side of the restriction groove opposing faces 23f1 and 23f2. With the protector 1, assuming that a force is applied to the first routing member W1 in a state where the stopper rib 24 is not provided on the connection face 20f3 side of the restriction groove opposing faces 23f1 and 23f2, it is concerned that the first routing member W1 may come off from the restriction groove 23 and move to the second routing member housing space 2s2. Meanwhile, with the protector 1 according to the embodiment, it is possible to suppress the first routing member W1 from coming off from the restriction groove 23 and being moved to the second routing member housing space 2s2 even when a force is applied to the first routing member W1 since the stopper rib 24 is provided on the connection face 20f3 side of the restriction groove opposing faces 23f1 and 23f2.

The protector 1 according to the embodiment has the following configuration. The restriction groove 23 provided in the connection face 20f3 of the protector 1 includes the curved part 23L formed curving. With the protector 1, assuming that a force is applied to the first routing member W1 in a state where the restriction groove 23 is formed linearly and the linear first routing member W1 is housed in the housing space 2s, it is concerned that the first routing member W1 may come off from the restriction groove 23 and move to the second routing member housing space 2s2. Meanwhile, with the protector 1 according to the embodiment, it is possible to maintain the contact between the peripheral face of the first routing member W1 and the inner face of the restriction groove 23 due to an elastic restoring force of the first routing member W1, since the first routing member W1 is housed in the first routing member housing space 2s1 formed by the restriction groove 23 having the curved part 23L. As a result, with the protector 1 according to the embodiment, it is possible to suppress the first routing member W1 from coming off from the restriction groove 23 and being moved to the second routing member housing space 2s2 even when a force is applied to the first routing member W1, since the contact between the peripheral face of the first routing member W1 and the inner face of the restriction groove 23 can be maintained due to an elastic restoring force of the first routing member W1 in the curved part 23L.

Note that the protector 1 of the embodiment is described above to have a single first routing member W1. However, the protector 1 according to the embodiment is not limited thereto, but may have a plurality of the first routing members W1. In that case, it is necessary to house the first routing members W1 collectively in the first routing member housing space 2s1 or to form the first routing member housing space 2s1 for corresponding to each of the first routing members W1.

Furthermore, the protector 1 of the embodiment is described above that the first routing member housing space 2s1 and the second routing member housing space 2s2 are arrayed in the second orthogonal direction Z, and the end part on the unfixed side of the second routing member W2 is moved along the first orthogonal direction Y. However, the protector 1 according to the embodiment is not limited thereto. More specifically, in the protector 1, the first routing member housing space 2s1 and the second routing member housing space 2s2 may be arrayed in the first orthogonal direction Y, and the end part on the unfixed side of the second routing member W2 may be moved along the second orthogonal direction Z.

Furthermore, the protector 1 of the embodiment is described above that the first fixing part 7 is positioned on the outer side of the housing space 2s, and the second fixing part 8 is positioned on the inner side of the housing space. However, the protector 1 according to the embodiment is not limited thereto. For example, in the protector 1, the first fixing part 7 may be positioned on the inner side of the housing space 2s, and the second fixing part 8 may be positioned on the outer side of the housing space. Moreover, in the protector 1, the first fixing part 7 and the second fixing part 8 may be positioned on the inner side of the housing space 2s or may be positioned on the outer side of the housing space 2s.

The protector according to the embodiment includes the above-described configuration, so that it is possible to suppress another routing member from being moved together with the desired routing member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protector for protecting a first routing member and a second routing member comprising:
   a first fixing part that fixes only the first routing member at a first end portion thereof;
   a second fixing part that fixes the first routing member at a second end portion thereof and a second routing member at a second end portion thereof, the second fixing part being away from the first fixing part; and
   a protector main body positioned between the first fixing part and the second fixing part, the protector main body including a housing space for housing the first routing member and the second routing member, wherein
   the housing space is configured with at least a pair of opposing faces opposing to each other and a connection face connecting the pair of opposing faces, and includes a first routing member housing space and a second routing member housing space,
   the second routing member housing space is configured with at least the pair of opposing faces and the connection face, and houses the second routing member,
   the first routing member housing space communicates with the second routing member housing space, is configured with a restriction groove provided in the connection face, and houses the first routing member, and
   the second routing member is only fixed to the protector main body at the second end portion thereof by the second fixing part, an opposite first end portion of the second routing member not being fixed to the protector main body by the first fixing part.

2. The protector according to claim 1, wherein
a diameter of the second routing member is larger than a diameter of the first routing member.

3. The protector according to claim 1, wherein
the restriction groove includes a pair of restriction groove opposing faces opposing to each other,
the protector main body includes a stopper rib that is protruded from at least one of the restriction groove opposing faces out of the pair of restriction groove opposing faces toward the first routing member housing space.

4. The protector according to claim 2, wherein
the restriction groove includes a pair of restriction groove opposing faces opposing to each other,
the protector main body includes a stopper rib that is protruded from at least one of the restriction groove opposing faces out of the pair of restriction groove opposing faces toward the first routing member housing space.

5. The protector according to claim 1, wherein
the restriction groove provided in the connection face of the protector includes a curved part formed curving.

6. The protector according to claim 2, wherein
the restriction groove provided in the connection face of the protector includes a curved part formed curving.

7. The protector according to claim 3, wherein
the restriction groove provided in the connection face of the protector includes a curved part formed curving.

8. The protector according to claim 4, wherein
the restriction groove provided in the connection face of the protector includes a curved part formed curving.

* * * * *